United States Patent
Petitgrand et al.

(10) Patent No.: US 10,289,492 B2
(45) Date of Patent: *May 14, 2019

(54) SYSTEM FOR DATA RETENTION AND METHOD OF OPERATING SYSTEM

(71) Applicant: M2Communication Inc., Hsinchu County (TW)

(72) Inventors: Fabien Petitgrand, Hsinchu County (TW); Huang-Lun Lin, Hsinchu County (TW)

(73) Assignee: M2 Communication Inc., Hsinchu County (TW)

( * ) Notice: Subject to any disclaimer, the term of this patent is extended or adjusted under 35 U.S.C. 154(b) by 389 days.

This patent is subject to a terminal disclaimer.

(21) Appl. No.: 15/133,710

(22) Filed: Apr. 20, 2016

(65) Prior Publication Data

US 2017/0308439 A1   Oct. 26, 2017

(51) Int. Cl.
| | |
|---|---|
| G06F 13/00 | (2006.01) |
| G06F 11/14 | (2006.01) |
| G06F 12/06 | (2006.01) |
| G06F 1/3287 | (2019.01) |
| G06F 1/3234 | (2019.01) |
| G06F 13/24 | (2006.01) |
| G06F 13/40 | (2006.01) |
| G06F 13/364 | (2006.01) |
| G06F 13/42 | (2006.01) |

(52) U.S. Cl.
CPC ........ *G06F 11/1435* (2013.01); *G06F 1/3243* (2013.01); *G06F 1/3287* (2013.01); *G06F 11/1469* (2013.01); *G06F 12/0638* (2013.01); *G06F 13/24* (2013.01); *G06F 13/364* (2013.01); *G06F 13/404* (2013.01); *G06F 13/4022* (2013.01); *G06F 13/4282* (2013.01); *G06F 2201/84* (2013.01); *G06F 2212/205* (2013.01); *Y02D 10/14* (2018.01); *Y02D 10/151* (2018.01)

(58) Field of Classification Search
CPC ............ G06F 11/1435; G06F 11/1469; G06F 12/0638; G06F 13/24; G06F 13/364; G06F 13/4022; G06F 13/404; G06F 13/4282; G06F 1/3243; G06F 1/3287; G06F 2201/84

See application file for complete search history.

(56) References Cited

U.S. PATENT DOCUMENTS

| | | | |
|---|---|---|---|
| 2008/0071972 A1* | 3/2008 | Kimura | G06F 1/305 711/103 |
| 2009/0164814 A1* | 6/2009 | Axford | G06F 1/3203 713/320 |

* cited by examiner

*Primary Examiner* — Idriss N Alrobaye
*Assistant Examiner* — Richard B Franklin
(74) *Attorney, Agent, or Firm* — Haynes and Boone, LLP

(57) ABSTRACT

A system having a first mode, a second mode and a system bus comprises a peripheral circuit, a power management unit (PMU), an additional wire and a control module. The peripheral circuit has a configuration information representing a circuit state thereof. The power management unit (PMU) generates an interrupt signal. The additional wire transmits therethrough the interrupt signal. The control module, in response to the interrupt signal, stores the configuration information via the system bus when the system is in the first mode and restores the configuration information via the system bus when the system is in the second mode.

17 Claims, 5 Drawing Sheets

SYSTEM FOR DATA RETENTION AND METHOD OF OPERATING SYSTEM

TECHNICAL FIELD

Embodiments in the present disclosure are related to a control module, and more particularly to a control module to retain configuration information and a method of operating the control module.

BACKGROUND

Power gating technology is usually used in a battery-supplied device or a low leakage-requirement system. A specific circuit can be shut down by turning off one or more power gates on the specific circuit having a circuit state, so as to achieve the purpose of low leakage. However, the circuit state is lost because of cutting off the power supply. The circuit state represented by configuration information is not permitted to be lost because that will cause the configuration information to be absent and cause an unknown status of the specific circuit. Usually, a retention flip-flop (FF) cell is adopted to keep the configuration information indicating the circuit state or configuration, and it cooperates with an additional controller such as a power management unit (PMU) to save and restore. A retention FF cell charges another cost and is only for a specific technology node. This will increase the cost of development and restrict the selection of technology. In addition, the retention FF cell has a larger area and current consumption in a power-on state.

Therefore, it is expected that a novel control module and a method can be adopted to store the configuration information when a system changes from an active mode to an idle mode, and to restore the configuration information when the system changes from the idle mode to the active mode. It is also expected that a novel system structure and a method can be adopted to solve both backup of the configuration information and large area and current consumption.

SUMMARY OF EXEMPLARY EMBODIMENTS

In accordance with one embodiment of the present disclosure, a system is disclosed. The system having a first mode, a second mode and a system bus, comprises a peripheral circuit, a power management unit (PMU), an additional wire and a control module. The peripheral circuit has a configuration information representing a circuit state thereof. The power management unit (PMU) generates an interrupt signal. The additional wire transmits therethrough the interrupt signal. The control module, in response to the interrupt signal, stores the configuration information via the system bus when the system is in the first mode and restores the configuration information via the system bus when the system is in the second mode.

In accordance with one embodiment of the present disclosure, a system is disclosed. The system having a first power mode and a second power mode comprises a peripheral circuit, a control module and a power management unit (PMU). The peripheral circuit has a configuration information representative of a circuit state thereof. The power management unit (PMU) is configured to enable the control module to store the configuration information when the system is in the first power mode and to retrieve the configuration information when the system is in the second power mode.

In accordance with a further embodiment of the present disclosure, the present invention discloses a system. The system having a first mode, a second mode and a system bus comprises a peripheral circuit and a control module. The peripheral circuit has a configuration information representative of a circuit state thereof. The control module has a storage device, storing the circuit state into the storage device via the system bus when the system is switched from the first mode to the second mode, and retrieves the circuit state from the storage device via the system bus when the system is switched from the second mode to the first mode.

The above embodiments and advantages of the present invention will become more readily apparent to those ordinarily skilled in the art after reviewing the following detailed descriptions and accompanying drawings.

DETAILED DESCRIPTION OF THE PREFERRED EMBODIMENTS

Figure 1:
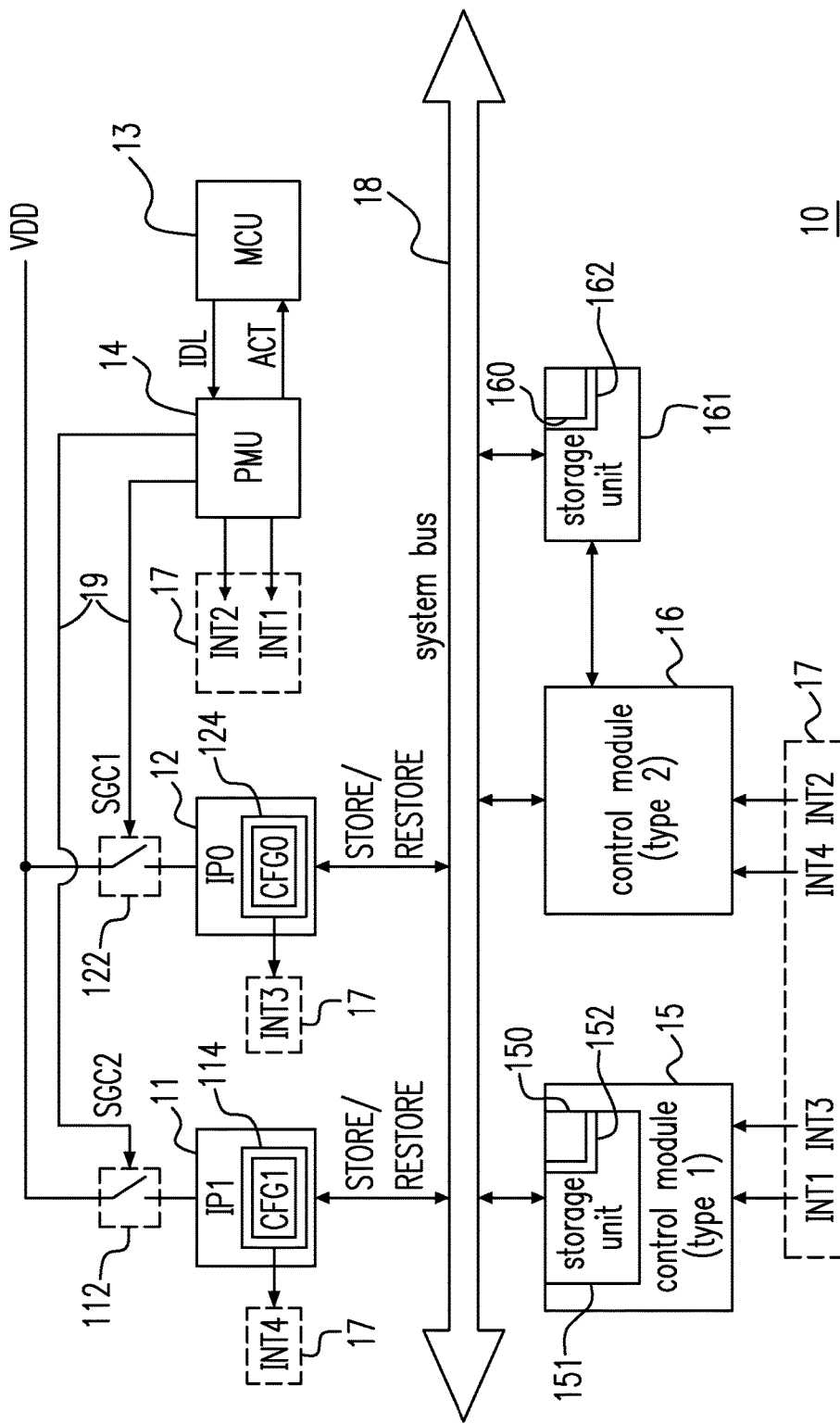
FIG. 1 shows a system for data retention of peripheral units according to the preferred embodiment of the present disclosure.

Please refer to FIG. 1, which shows a system 10 for data retention of peripheral units 11 and 12 according to the preferred embodiment of the present disclosure. The system 10 has an active mode, an idle mode and a system bus 18 includes a peripheral unit 11, a power management unit (PMU) 14, an additional connection 17 and a control module 15. The peripheral unit 11 has configuration information CFG1 representative of a circuit state thereof. The power management unit (PMU) 14 generates a hardware interrupt signal INT1. The additional connection 17 transmits therethrough the hardware interrupt signal INT1. The control module 15 stores the configuration information CFG1 in the internal storage unit 151 in response to the hardware interrupt signal INT1 when the system 10 operates in the idle mode and retrieves the configuration information CFG1 when the system 10 operates in the active mode.

The system 10 further includes a peripheral unit 12, a micro control unit (MCU) 13, a control module 16, a storage unit 161, and a system bus 18. The peripheral unit 11 can be an in-house intellectual property (IP) circuit IP1, and the peripheral unit 12 can be a third-party IP circuit IP0. The third-party IP circuit IP0 usually has no retention DFF so some external unit must be used to backup its configuration information before it is powered off. The control modules 15 and 16 can be classified into two types, wherein one type has a built-in storage unit 151, and the other type has an external storage unit 161. The additional connection 17 can be a wire connection which is independent from the system bus 18 and is also independent from each wire. In some embodiments, the PMU 14 generates an interrupt signal INT2. The additional connection 17 transmits therethrough the interrupt signal INT2. The control module 16 stores the configuration information CFG1 in the external storage unit 161 in response to the interrupt signal INT2 when the system 10 operates in the idle mode, low power mode or sleep mode and restores the configuration information CFG1 when the system 10 operates in the active mode.

In FIG. 1, each of the storage units 151 and 161 is a relative high-density storage unit. The storage units 151 and 161 respectively include instruction memories (IMs) 152 and 162. The storage units 151 and 161 respectively store programs 150 and 160 in the instruction memories 152 and 162. The peripheral units 12 and 11 respectively have a first circuit state and a second circuit state. The configuration information CFG0 and the configuration information CFG1 are respectively associated with the first and the second circuit states. The control module 15 or 16 is further used with the MCU 13 and the PMU 14. The peripheral unit 12 includes at least one flip-flop register 124 to contain the configuration information CFG0 when the peripheral unit 12 is powered on. The peripheral unit 11 includes at least one flip-flop register 114 to contain the configuration information CFG1 when the peripheral unit 11 is powered on. Each of the storage units 151, 161 includes at least one of a non-volatile storage component and a volatile storage component, wherein the non-volatile storage component includes a flash memory, the volatile storage component includes a static random-access memory (SRAM) Any of the flash memory, the SRAM has a smaller area size than that of any of the flip-flop registers 124 and 114 for the same chip process. For example, the SRAM has ⅟₂₃ size in area than those of the flip-flop register 124, 114, which are retention FFs of the peripheral unit 12, 11 respectively for the same 55 nm technology. Therefore, the present disclosure improves the chip area and chip density of flip-flop registers 114 and 124. In addition, the peripheral units 12 and 11 respectively include the flip-flop registers 124 and 114 to contain the configuration information CFG0 and the configuration information CFG1 respectively when the peripheral units 12 and 11 are respectively powered on, and the SRAM consumes a smaller leakage current than that of any of the flip-flop registers 124 and 114 in the idle mode for the same chip process. For example, the SRAM has ¼ leakage current than those of the flip-flop register 124, 114 for the same 55 nm technology. Therefore, the present disclosure improves power consumption of the flip-flop registers 114 and 124.

Figure 2:
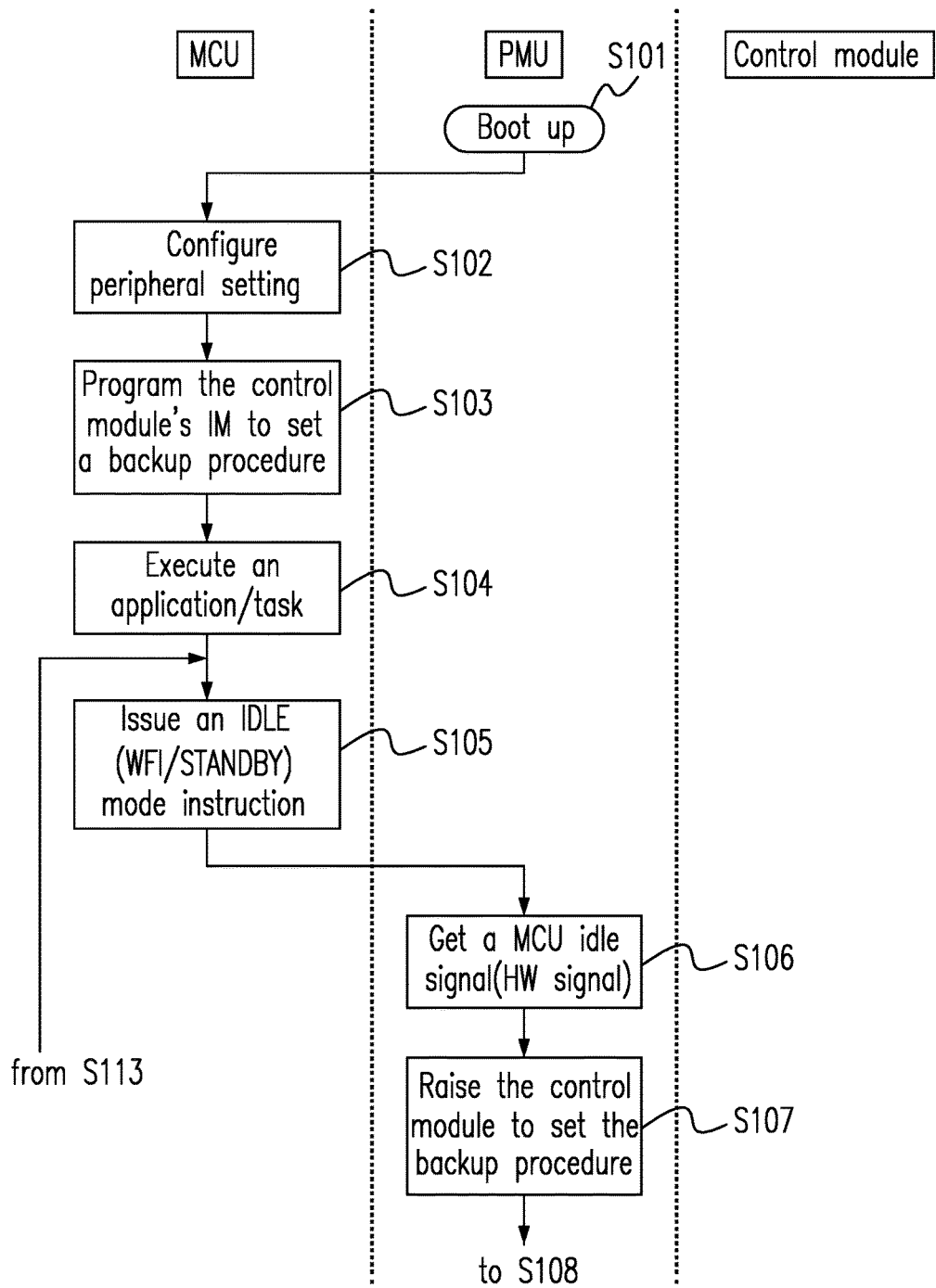
FIG. 2 shows preparation before backup and restoration of the configuration information according to the preferred embodiment of the present disclosure.

When the system 10 having the system bus 18 enters an idle mode, the MCU 13 outputs an idle signal to the PMU 14 before the MCU 13 is idle; i.e., the MCU 13 informs the PMU 14 first, and then becomes idle. The PMU 14 outputs the hardware interrupt signals INT1 and INT2 respectively to the control modules 15 and 16 via the additional connection 17 in response to receipt of the idle signal IDL. The control modules 15 and 16 respectively store the configuration information CFG0 and CFG1 coming from the peripheral unit 12 and 11 via the system bus 18 in response to receipt of the respective hardware interrupt signals INT1 and INT2. Alternatively, the PMU 14 does not inform the control module 16 to store the configuration information CFG1, and the control module 15 may continue to store other configuration information CFG1. The PMU 14 shuts down the peripheral units 12 and 11 by respectively using gate control signals SGC1 and SGC2 through an independent wire 19 to save power. In some embodiments, metal oxide semiconductor (MOS) switches 122 and 112 can respectively receive the gate control signal SGC1 and SGC2. If the MOS switches 122 and 112 have the same gate power-on and power-off voltages, the independent wire 19 can be integrated as one to share the same gate control signal. When the system 10 and the system bus 18 operate in or enter an active mode, the PMU 14 wakes up the MCU 13 by outputting an active signal ACT to the MCU 13 the PMU 14 powers on the peripheral unit 12 and 11 by respectively using the gate control signal SGC1 and SGC2 through the independent wire 19 and outputs the hardware interrupt signal INT1 and INT2 via the additional connection 17 respectively to the control module 15 and 16 and the control module 15 and 16 respectively restore the configuration information CFG0 and the configuration information CFG1 to the peripheral units 12 and 11 via the system bus 18 in response to receipt of the respective hardware interrupt signal INT1 and INT2. Then, the PMU 14 outputs the active signal ACT to wake up the MCU 13. In some embodiments, the PMU 14 can output the hardware interrupt signal INT1 and INT2 to respectively trigger the control modules 15 and 16 to store the configuration information CFG0 and the configuration information CFG1 according to its built-in timer which is set by the MCU 13 in advance, and thus the PMU 14 lets the system 10 operate in or enter the idle mode within a predetermined period of time. In some embodiments, the PMU 14 can wake up the control module 15 and 16 according to its built-in timer which is set by the MCU 13 in advance, and thus the control module 15 and 16 can respectively restore the configuration information CFG0 and the configuration information CFG1. Please note that the two control modules 15 and 16 do not need to operate at the same time because they are just different types of control module, but it prefers only one control module 15 or 16 is needed to complete the storage and restoration tasks throughout the present disclosure Please refer to FIG. 2, which shows the preparation before backup and restoration of the configuration information CFG0 according to the preferred embodiment of the present disclosure. Please refer to FIGS. 1 and 2, in step S101, the PMU 14 boots up. In step S102, the MCU 13 configures the peripheral units 12 setting. In step S103, the MCU 13 programs the IM 152 of the control module 15 to set a backup procedure. In step S104, the MCU 13 executes an application or a task. In step S105, the MCU 13 issues the idle signal IDL by a WFI (wait for interrupt) instruction or a standby instruction. In step S106, the PMU 14 gets an idle signal IDL from the MCU 13. In step S107, the PMU 14 raises an interrupt to notice the control module 15 to set the backup procedure. Please note that the MCU 13 is idle after it issues the idle signal IDL to the PMU 14, and the PMU 14 takes over the job of the MCU 13, and thus system software does not need to instruct the MCU 13 to deal with the backup procedure and can save power because the MCU 13 is usually powerful and complex and consumes more power.

Figure 3:
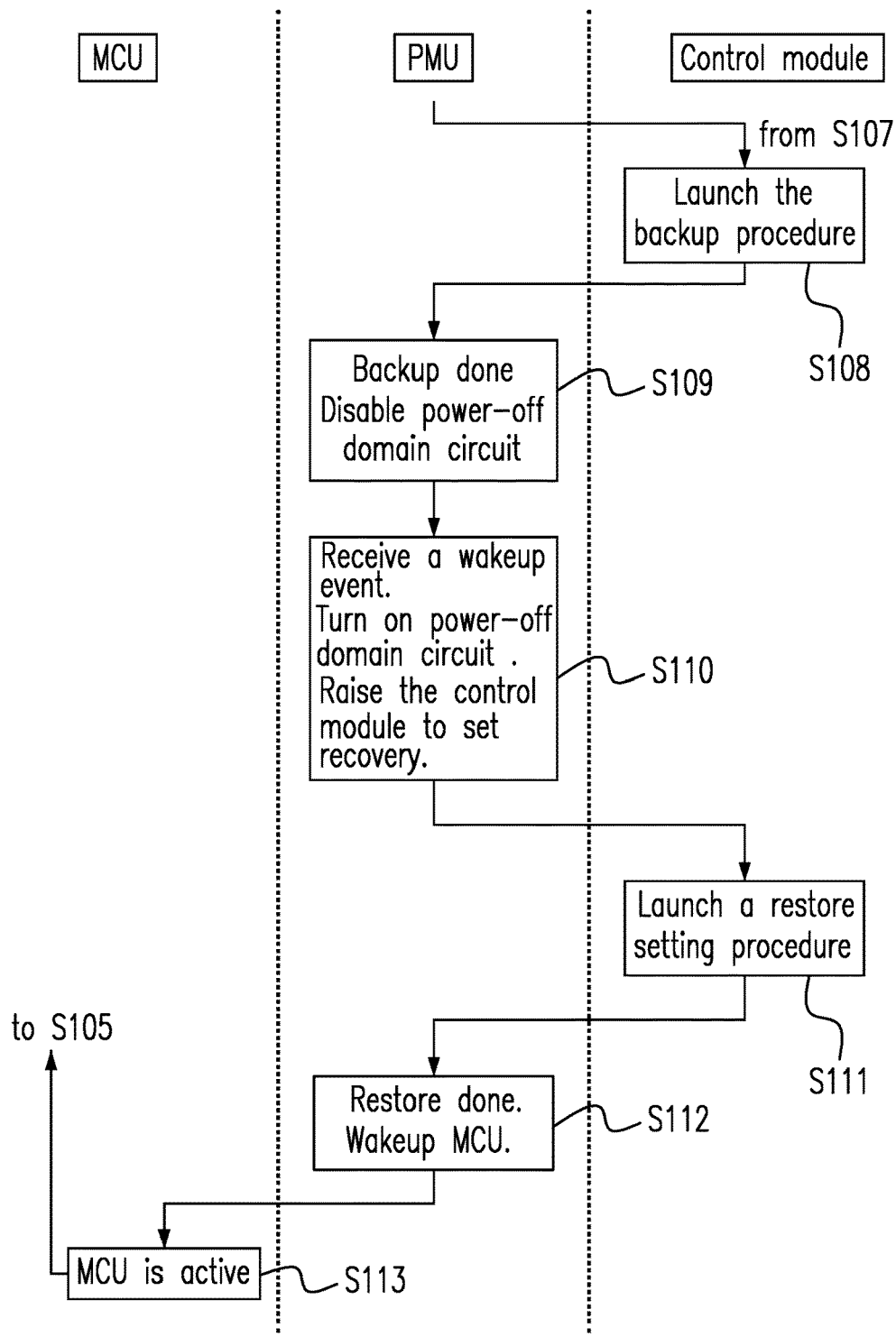
FIG. 3 shows backup and restoration procedures according to the preferred embodiment of the present disclosure.

Please refer to FIG. 3, which shows the backup and restoration procedures according to the preferred embodiment of the present disclosure. In step S108, the control module 15 launches the backup procedure. In step S109, the PMU 14 disables a power-off domain circuit when the backup procedure is complete. For example, the power-off domain circuit includes the in-house IP circuit IP0 and the third-party IP circuit IP1. In step S110, the PMU 14 receives a wake-up event, turns on the power-off domain circuit and raises the control module 15 to start the recovery. The wake-up event may be a timer expire, a keyboard strike, a screen touch or the like. In step S111, the control module 15 launches a restoration procedure. In step S112, the PMU 14 wakes up the MCU 13 when the restore procedure is complete. In step S113, the MCU 13 is active, and then the step flow goes to step S105.

Figure 4:
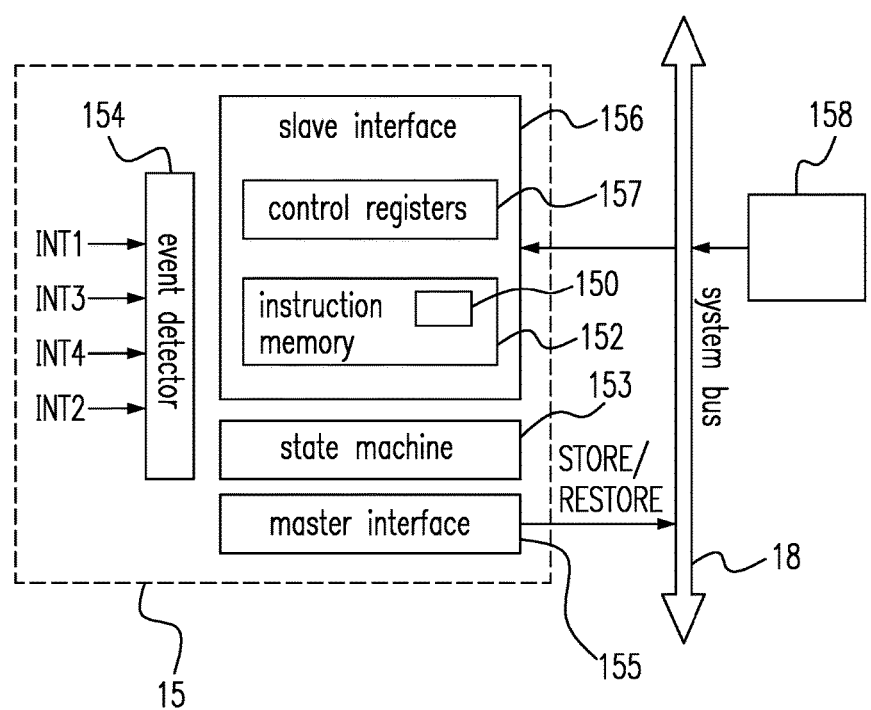
FIG. 4 shows the control module in detail according to the preferred embodiment of the present disclosure.

Please refer to FIG. 4, which shows the control module 15 in detail according to the preferred embodiment of the present disclosure. The control module 15 further includes a state machine unit 153 and an event detector 154. The state machine unit 153 is configured to operate under the program 150. In some embodiments, the event detector 154 is configured to receive the hardware interrupt signals INT3 and INT4 from the peripheral units 12 and 11 respectively via the additional connection 17, wherein the event detector 154 is coupled to the state machine 153, and triggers the state machine 153 to perform one of storing and retrieving the configuration information CFG0 respectively to and from the storage unit 151 via the system bus 17.

Please refer to FIGS. 1 and 4, the program 150 instructs the state machine 153 to store the configuration information CFG0 in the IM 152 via the system bus 18 when the system 10 switches from the active mode to the idle mode, and to restore the configuration information CFG0 from the IM 152 via the system bus 18 when the system 10 switches from the idle mode to the active mode. The control module 15 further includes a master interface 155, a slave interface 156 and a control register 157. The master interface 155 is configured to access the flip-flop register 124 or 114 on the system bus 18 by issuing one of a store and a load command. The slave interface 156 is controlled by a master device 158 on the system bus 18, for example, the MCU 13. The control register 157 is configured by the master device 158 via the slave interface 156 to store a task arrangement, a trigger event mask setting and a status of the control module 15. The state machine 153 is coupled to the IM 152, the master interface 155 and the slave interface 156. The event detector 154 is configured to trigger the state machine 153 by at least one of events being one selected from a group consisting of a general purpose input output, a timer expiration and an interrupt.

In some embodiments, the control module 15 provides a storage operation and a restoration operation. In the storage operation, the control module 15 will only perform read transactions from the system bus 18 and store the values in its IM 152. A single instruction stored in the IM 152 has two 32-bits parts, one part is for the read address, and the other part is a place-holder to represent the read value. In the restoration operation, the control module 15 will only perform writing transactions through the system bus 18. The instruction format is the same as that for the storage operation, with a 32-bit address and a 32-bit value to write.

Figure 5:
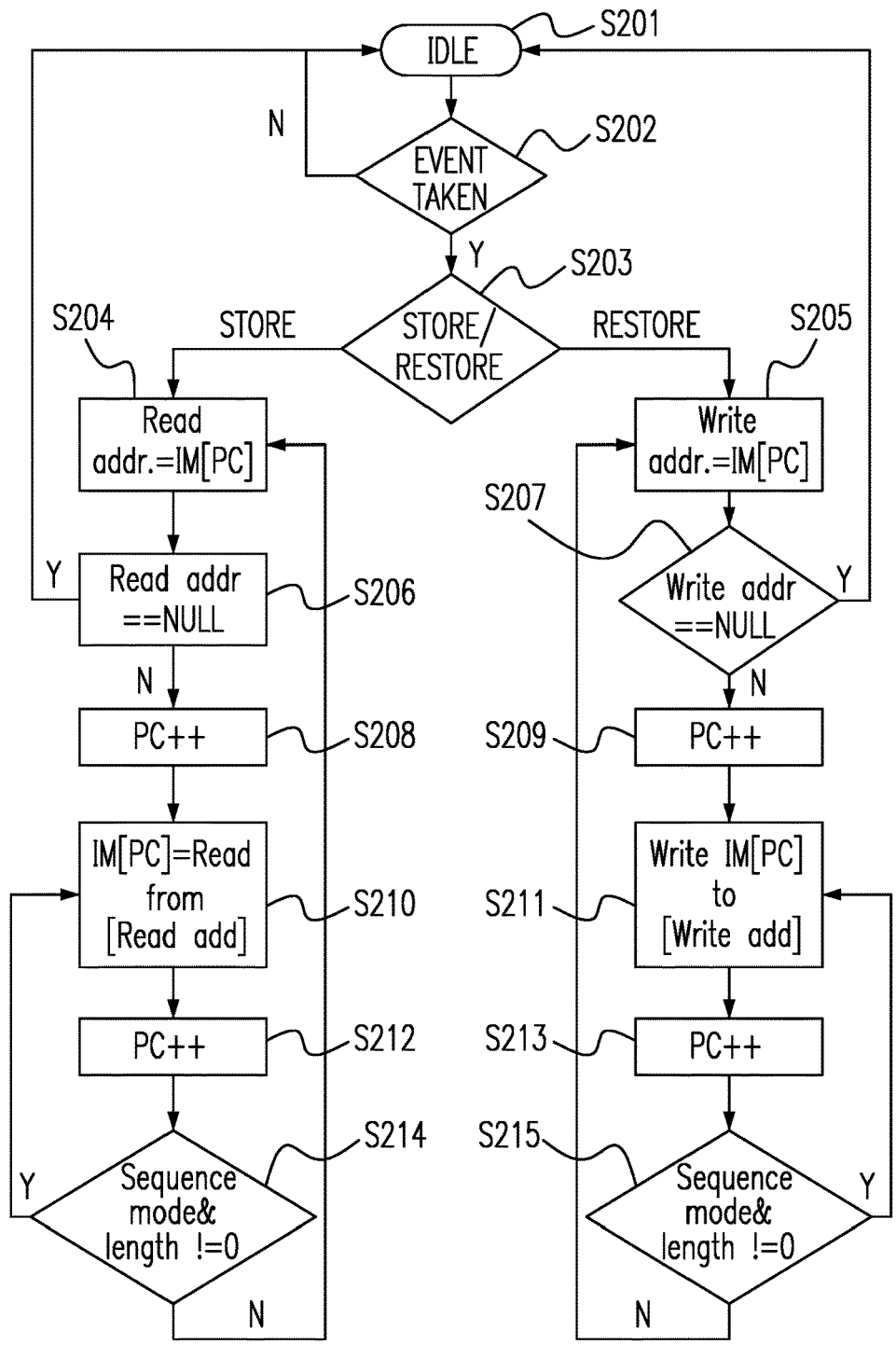
FIG. 5 shows operations of the state machine in the idle mode according to the preferred embodiment of the present disclosure.

Please refer to FIG. 5, which shows the operation of the state machine 15 in the idle mode according to the preferred embodiment of the present disclosure. The state machine 15 is a finite state machine (FSM) and can perform the storage and the restoration operations under the program 150. Please return to FIG. 1, the peripheral unit 12 is configured by MCU 13 after the system bus 18 is initialized. and the MCU 13 sets the program 150 that the a start pointer refer to peripheral unit 12 for back up purpose. The program 150 configures the peripheral unit 12 to determine a pointer address indicating where the configuration information CFG0 is when the system 10 is powered on, and when the system bus 18 is initiated, the pointer address is stored at a first address of the instruction memory 152. Please refer to FIGS. 4 and 5, in step S201, when the system 10 operates in the idle mode, the step flow goes to step S202. In step S202, a first decision is made on whether any event is detected by the event detector 154. When the first decision is positive, the step flow goes to step S203; when the first decision is negative, the step flow returns to step S201. In step S203, the event detector 154 detects the hardware interrupt signal INT1 to determine which operation should be performed. When the storage operation is performed, the step flow goes to step S204; when the restoration operation is performed, the step flow goes to step S205. For example, the hardware interrupt signal INT1 may include two kinds of enable signals ENA1-1 and ENA1-2 (not shown), the enable signal ENA1-1 can enable and disable the storage operation, and the enable signal ENA1-2 can enable and disable the restoration operation. The enable signals ENA1-1 and ENA1-2 cannot enable both the storage and restoration operations at the same time. In step S204, the state machine 153 performs a read operation to store the configuration information CFG0 from the peripheral unit 12, and the read operation includes the following steps S204, S206, S208, S210, S212 and S214. In step S204, the program 150 instructs the state machine 153 to read the pointer address at the first address. For example, the pointer address is stored at the program counter (PC) of the IM 152 as in step S204. The PC indicates the first address of the IM 152. In step S206, a second decision is made on whether the state machine 153 reads a null pointer address. When the second decision is positive, the step flow returns to step S201; when the second decision is negative, the step flow goes to step S208. In step S208, the PC of the IM 152 accumulates an offset value to generate a new PC, i.e., a second address of the IM 152, and then the step flow goes to step S210.

In step S210, the state machine 153 reads the configuration information CFG0 located at the pointer address and stores the configuration information CFG0 at a second address of the instruction memory, wherein the second address is the first address accumulated by a single offset value. In step S212, the PC is accumulated by another offset value and it indicates a third address of the IM 152, and therefore further configuration information may be continuously stored at the third address of the IM 152. For example, the state machine 153 can continue to store the configuration information CFG1 at the third address of the IM 152. In step S214, if a sequence read mode is required, and a memory space referred by the second address is not enough to fit the configuration information CFG0, i.e., some bits of the configuration information CFG0 are left, not stored at the second address of the IM 152, and the length of those bits left is still not zero, then the step flow goes to step S210. If the sequence read mode is not required, and the memory space referred by the second address is enough to fit the configuration information CFG0, i.e., no bit of the configuration information CFG0 is left, and a length of those bits left is zero, then the step flow returns to step S204. In some embodiments, one length equals to 32 bits; and if a sequence of read operations are performed, then several lengths may be allocated by the control module 15. Throughout steps S204, S206, S208, S210, S212 and S214, the read operation can be a mix type operation including at least one of a single read and a sequence of read operations.

In step S205 of FIG. 5, the restoration operation starts. The state machine 153 performs a writing operation to restore the configuration information CFG0 to the peripheral unit 12, and the writing operation includes steps S205, S207, S209, S211, S213 and S215. The program 150 instructs the state machine 153 to retrieve the configuration information CFG0 at a second address of the IM 152. Then, the state machine 153 retrieves the pointer address at the first address of the IM 152. In step S207, if the pointer address isn't null, then the step flow goes to step S209; if yes, then it returns to step S201. In step S209, the PC of the IM 152 increases by a single offset, such as 4 bytes, i.e., 32 bits. For example, the PC equals to PC+4. In step S211, the state machine 153 writes the configuration information CFG0 to where the pointer address refers. In step S213, the PC of the IM 152 accumulates by another single offset. For example, the PC equals to PC+4+4=PC+8. In step S215, if a sequence writing mode is required, and the retrieval of the configuration information CFG0 at the second address is not completed, i.e., some bits of the configuration information CFG0 are left, not retrieved at the second address of the IM 152, and a length of those bits left is still not zero, then the step flow goes to step S211. If the sequence writing mode is not required, and the retrieval of the configuration information CFG0 at the second address is completed, i.e., no bit of the configuration information CFG0 is left, and a length of those bits left is zero, then the step flow returns to step S205. Throughout steps S205, S207, S209, S211, S213 and S215, the write operation can be a mix type operation including at least one of a single write and a sequence of write operations.

In some embodiments, two instances are used for storage and restoration operations. The single read operation causes the control module 15 to store data at one beat per instruction. Please refer to Table 1, which shows a single read operation according to the preferred embodiment of the present disclosure.

TABLE 1

| Operation | IM content | IM Address |
|---|---|---|
| RA | 0050000C | PC+0 |
| RD | Xxxxxxxx | PC+4 |
| RA | 00500010 | PC+8 |
| RD | Xxxxxxxx | PC+12 |
| RA | 00500020 | PC+16 |
| RD | Xxxxxxxx | PC+20 |
| RA | 0 | PC+24 |

In Table 1, the single read operation causes the control module 15 to store data at one beat per instruction. The control module 15 will execute the following procedure:
1. Read address 0050000C and store the read data in IM [PC+4].
2. Read address 005000010 and store the read data in IM [PC+12].
3. Read address 005000020 and store the read data in IM [PC+20].

In Table 1, the PC is a starting address configured by the program 150. The PC is 4 bytes and is accumulated by a single offset value after each read operation, wherein the single offset value is 4 bytes. The symbol "xxxxxxxx" represents an unknown state because the configuration information CFG0 has not yet been stored in the IM 152. For the first single read operation, when the system 10 is powered on, the pointer address 0050000C is stored in IM content referred by IM address PC+0. Then, the control module 15 reads the configuration information CFG0 referred by the pointer address 0050000C, and stores the configuration information CFG0 to IM content referred by the IM address PC+4. Similarly, the second single read operation and the third single read operation are processed in the same way.

Please refer to Table 2, which shows a single writing operation according to the preferred embodiment of the present disclosure.

TABLE 2

| Operation | IM content | IM Address |
|---|---|---|
| WA | 0050000C | PC+0 |
| WD | 11111111 | PC+4 |
| WA | 00500010 | PC+8 |
| WD | 22222222 | PC+12 |
| WA | 00500020 | PC+16 |
| WD | 33333333 | PC+20 |
| WA | 0 | PC+24 |

In Table 2, the single writing operation causes the control module 15 to restore data at one beat per instruction. The control module 15 will execute the following procedure:
1. Write the configuration information 0x11111111 to the pointer address 0050000C.
2. Write the configuration information 0x22222222 to the pointer address 00500010.
3. Write the configuration information 0x33333333 to the pointer address 00500020.

In Table 2, the write operation is a reverse operation of the read operation and restores the configuration information CFG0 to the peripheral unit 12. In the first write operation, the program 150 instructs the state machine 153 to retrieve the configuration information 11111111 at IM address PC+4. The state machine 153 retrieves the pointer address 0050000C at IM address PC+0. The state machine 153 writes the configuration information 11111111 to where the pointer address 0050000C refers. Thus, the control module 15 completes restoration of the configuration information CFG0 to the peripheral unit 12. Similarly, the second single write operation and the third single write operation are processed in the same way.

The sequence read or write operation can reduce the memory size usage of the IM 152 using the continuous access. It causes the control module 15 to store or restore multiple data per instruction. Please refer to Table 3, which shows a sequence of read operations according to the preferred embodiment of the present disclosure.

TABLE 3

| Operation | IM content | IM Address |
|---|---|---|
| RA | 005000CF | PC+0 |
| RD | xxxxxxxx | PC+4 |
| RD | xxxxxxxx | PC+8 |
| RD | xxxxxxxx | PC+12 |
| RD | xxxxxxxx | PC+16 |
| RD | xxxxxxxx | PC+20 |
| RD | xxxxxxxx | PC+24 |
| RD | xxxxxxxx | PC+28 |
| RD | xxxxxxxx | PC+32 |
| RA | 0 | PC+36 |

In some embodiments, the pointer address 005000CF includes control bits that can determine whether the read operation is a single read operation or a sequence read operation, and determine how many beats should be performed in one sequence read operation. For example, the hexadecimal bits "CF" in the pointer address 005000CF can be translated to the binary bits "11001111". The bit 0 is one binary value "1" specifying that the sequence read operation is performed. The bits 1 to 5 are five binary values "0111" specifying the storage count is seven decimals. This indicates that the program 150 makes the control module 15 to read the pointer address 00500000 and store the configuration information CFG0 at IM address PC+4, and then continue to store other configuration information starting from IM address PC+8 for seven times. For example, the next pointer address will add 4 automatically, the control module 15 stores the read data referred by the next pointer address 005000C4 in IM content of IM address PC+8, and repeat the above operation seven times. Therefore, the total storage counts is eight beats in one sequence read. The sequence read operation is disabled when the eight-beat storage actions is completed.

The storage and the restoration operations provide both single and sequence modes. The program 150 can set an arbitrary single or sequence storage/restoration operation for a particular purpose. Single mode provides basic access operation, and the sequence mode has better memory utilization. The program 150 can mix the two types of mode operation to achieve the intention of consecutive access and lower the memory size usage.

Please refer to Table 4, which shows a mixed mode of single and sequence mode operations according to the preferred embodiment of the present disclosure.

TABLE 4

| Operation | IM content | IM Address |
|---|---|---|
| RA | 0050000C | PC+0 |
| RD | xxxxxxxx | PC+4 |
| RA | 005000C5 | PC+8 |
| RD | xxxxxxxx | PC+12 |
| RD | xxxxxxxx | PC+16 |
| RD | xxxxxxxx | PC+20 |
| RA | 00500085 | PC+24 |
| RD | xxxxxxxx | PC+28 |
| RD | xxxxxxxx | PC+32 |
| RD | xxxxxxxx | PC+36 |
| RA | 00500090 | PC+40 |
| RD | xxxxxxxx | PC+44 |
| RA | 0 | PC+48 |

In Table 4, the procedure of the mixed mode is as follows:
1. A single storage operation is performed. Read the pointer address 0050000C and store the read data in IM content of IM [PC+4].
2. A sequence of storage operations are performed. Read the pointer addresses 00500000 to 00500008 and store the read data in IM contents of IM address IM [PC+12], [PC+16] and [PC+20] respectively.
3. A sequence of storage operations are performed. Read the pointer addresses 00500080 to 00500088 and store the read data in IM contents of IM address IM [PC+28], [PC+32] and [PC+36] respectively.
4. A single storage operation is performed. Read address 00500090 and store the read data in IM content of IM address IM [PC+44].

Embodiments

1. A system having a first mode, a second mode and a system bus, comprises a peripheral circuit, a power management unit (PMU), an additional wire and a control module. The peripheral circuit has a configuration information representing a circuit state thereof. The power management unit (PMU) generates an interrupt signal. The additional wire transmits therethrough the interrupt signal. The control module, in response to the interrupt signal, stores the configuration information via the system bus when the system is in the first mode and restores the configuration information via the system bus when the system is in the second mode.

2. The system in Embodiment 1, wherein the first mode is an idle mode, and the second mode is an active mode. The peripheral circuit includes at least a flip-flop register to contain the configuration information when the peripheral circuit is powered on. The control module comprises a storage unit including at least one of a non-volatile storage component having a flash memory and a volatile storage component having a static random-access memory (SRAM), wherein each of the flash memory and the SRAM has an area size smaller than that of the flip-flop register and consumes a smaller leakage current than the flip-flop register does in the idle mode.

3. The system of any one of Embodiments 1-2, wherein the peripheral circuit includes a first type peripheral circuit being an in-house intellectual property (IP) circuit and a second type peripheral circuit being a third party circuit which has no retention register to store the configuration information.

4. The system of any one of Embodiments 1-3, further comprising a micro control unit (MCU), wherein the first mode is an idle mode and the second mode is an active mode, the peripheral circuit includes a metal oxide semiconductor (MOS) unit, and when the system changes from the active mode to the idle mode, the MCU outputs an idle signal to the PMU and then powers itself off, the PMU outputs the interrupt signal to inform the control module to store the configuration information in response to the idle signal, and the PMU issues a gate control signal to a gate of the MOS to shut down the peripheral circuit after the configuration information has been stored in the control module.

5. The system of any one of Embodiments 1-4, further comprising a micro control unit (MCU), wherein the first mode is an idle mode and the second mode is an active mode, the peripheral circuit includes a metal oxide semiconductor (MOS) unit and has a built-in timer setting, and when the system changes from the idle mode to the active mode, the PMU issues a gate control signal to a gate of the MOS to power on the peripheral circuit in response to the built-in timer setting, the PMU outputs the interrupt signal to inform the control module to restore the configuration information, and the PMU outputs an activate signal to wake up the MCU.

6. The system of any one of Embodiments 1-5, further comprising a micro control unit (MCU), wherein the control module includes an SRAM to store a program, and when the system is initialized, the MCU configures the control module to program the SRAM through the system bus, and the control module performs one of storing and restoring procedures under the program.

7. The system of any one of Embodiments 1-6, further comprising a micro control unit (MCU), wherein the control module includes an instruction memory (IM), the MCU configures a pointer address when the system is initialized, wherein the pointer address defines where the configuration information should be stored in the IM, and the pointer address includes a plurality of control bits that specify one of a single read operation and a consecutive read operation that should be performed by the control module per a storage instruction.

8. The system of any one of Embodiments 1-7, wherein the plurality of control bits include a least significant bit and a predetermined number of bits which are consecutive following the least significant bit, the least significant bit determines one of the single read operation and the consecutive read operation should be performed, and the predetermined number of bits determine how many consecutive read operations should be performed per the storage instruction.

9. A system having a first power mode and a second power mode comprises a peripheral circuit, a control module and a power management unit (PMU). The peripheral circuit has a configuration information representative of a circuit state thereof. The power management unit (PMU) is configured to enable the control module to store the configuration information when the system is in the first power mode and to retrieve the configuration information when the system is in the second power mode.

10. The system in Embodiment 9, further comprising a micro control unit (MCU), wherein the first power mode is an idle mode, and the second power mode is an active mode. The peripheral circuit includes at least a flip-flop register to contain the configuration information when the peripheral circuit is powered on. The control module includes an instruction memory (IM). The MCU programs the instruction memory to set up a backup procedure when the system is initialized. The control module configures the peripheral unit to write a pointer address to where a first address of the IM is referred, wherein the pointer address indicates where the configuration information is stored. The control module reads the configuration information located at the pointer address and stores the configuration information at a second address of the instruction memory when the backup procedure starts and the control module executes a storage instruction, wherein the second address is the first address accumulated by a single offset value.

11. The system of any one of Embodiments 9-10, wherein the pointer address includes a plurality of control bits having a least significant bit and predetermined number of bits which are consecutive following the least significant bit, the least significant bit determines whether one of a single read operation or a consecutive read operation should be performed, and the predetermined number of bits determine how many consecutive read operations should be performed per the storage instruction.

12. The system of any one of Embodiments 9-11, wherein the first power mode is an idle mode and the second power mode is an active mode. The control module includes an instruction memory (IM). The control module instructs the peripheral unit to write a pointer address to where a first address of the IM is referred, wherein the pointer address indicates where the configuration information is stored to. The PMU informs the control module to start a restoration procedure when the system is switched from the idle mode to the active mode. The pointer address includes a plurality of control bits including a least significant bit and a predetermined number of bits which are consecutive following the least significant bit, the least significant bit determines whether one of a single write operation or a consecutive write operation should be performed, and the predetermined number of bits determine how many consecutive write operations should be performed per a restoring instruction. The control module performs a write operation to restore the configuration information to the peripheral unit when the restoration procedure starts and the control module executes a restoration instruction, wherein the write operation includes the control module retrieves the configuration information at a second address of the instruction memory. The control module writes the configuration information to the peripheral unit to complete restoration of the configuration information. The control module continues the write operation when the least significant bit indicates that a consecutive write operation should be performed.

13. The system of any one of Embodiments 9-12, wherein the pointer address includes 32 binary bits, the consecutive write operation writes at least two sequences of 32 binary bits for the configuration information, and writes an additional sequence of 32 binary bits when at least one rest bit of the configuration information remains, wherein the at least one rest bit is less than 32 bits.

14. The system of any one of Embodiments 9-13, wherein if the pointer address is not null, the first address of the IM is increased by a single offset which is 4 bytes. If the pointer address is null, the system waits for another restoration instruction.

15. A system having a first mode, a second mode and a system bus comprises a peripheral circuit and a control module. The peripheral circuit has a configuration information representative of a circuit state thereof. The control module has a storage device, storing the circuit state into the storage device via the system bus when the system is switched from the first mode to the second mode, and retrieves the circuit state from the storage device via the system bus when the system is switched from the second mode to the first mode.

16. The system in Embodiment 15, wherein the control module is a programmable controller including a master interface and a slave interface. The master interface is configured to access the configuration information through the system bus by issuing one of a storage and a restoration commands. The slave interface is configured to be controlled by a master device through the system bus, wherein the master device is a micro control unit (MCU), and the slave interface includes a control register and an instruction memory (IM). The control register is configured to store a task arrangement, a trigger event mask setting and a status of the controller, wherein the control register is configured by the master device via the slave interface. The instruction memory (IM) is configured to store a program.

17. The system of any one of Embodiments 15-16, wherein the first mode is an active mode, and the second mode is an idle mode. The control module is used with a power management unit (PMU) and further includes a state machine unit and an event detector. The state machine unit is configured to operate under the program. The event detector is configured to trigger the state machine unit by at least one event selected from a group consisting of a general purpose input and output, a timer expiration and an enable signal through an additional connection.

18. The system of any one of Embodiments 15-17, wherein when the system is initialized, the MCU configures the slave interface to program the IM. When the system is switched from the active mode to the idle mode, the MCU informs the PMU by outputting an idle signal and goes idle, the PMU outputs an enable signal in response to the idle signal, the event detector triggers the state machine to store the configuration information under the program in response to receiving the enable signal, and then the PMU shuts down the peripheral unit. When the system is switched from the idle mode to the active mode, the PMU powers on the peripheral unit in response to the built-in time out thereof, restores the configuration information, and then powers on the MCU by outputting an activating signal.

19. The system of any one of Embodiments 15-18, further comprising a micro control unit (MCU), wherein the system includes a micro control unit (MCU), the control module includes an instruction memory (IM), the control module configures a pointer address when the system is awakened, wherein the pointer address defines where the configuration information should be restored to the peripheral unit, and the pointer address includes a plurality of control bits that specify whether one of a single write operation or a consecutive write operation should be performed by the control module per a restoration instruction.

20. The system of any one of Embodiments 15-19, wherein the plurality of control bits include a least significant bit and a predetermined number of bits which are consecutive following the least significant bit, the least significant bit determines whether one of the single write operation or the consecutive write operation should be performed, and the predetermined number of bits determine how many consecutive write operations should be performed per the restoration instruction.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A system having a first mode, a second mode and a system bus, comprising:
    a peripheral circuit having a configuration information representing a circuit state thereof;
    a power management unit (PMU) generating an interrupt signal;
    an additional wire transmitting therethrough the interrupt signal;
    a control module, in response to the interrupt signal, storing the configuration information via the system bus when the system is in the first mode and restoring the configuration information via the system bus when the system is in the second mode; and
    a micro control unit (MCU), wherein the control module includes an SRAM to store a program, and when the system is initialized, the MCU configures the control module to program the SRAM through the system bus, and the control module performs one of storing and restoring procedures under the program.

2. The system as in claim 1, wherein:
    the first mode is an idle mode, and the second mode is an active mode;
    the peripheral circuit includes at least a flip-flop register to contain the configuration information when the peripheral circuit is powered on; and
    the control module comprises a storage unit including at least one of a non-volatile storage component having a flash memory and a volatile storage component having the static random-access memory (SRAM), wherein each of the flash memory and the SRAM has an area size smaller than that of the flip-flop register and consumes a smaller leakage current than the flip-flop register does in the idle mode.

3. The system as in claim 1, wherein the peripheral circuit includes a first type peripheral circuit being an in-house intellectual property (IP) circuit and a second type peripheral circuit being a third party circuit which has no retention register to store the configuration information.

4. The system as in claim 1, further comprising a micro control unit (MCU), wherein the first mode is an idle mode and the second mode is an active mode, the peripheral circuit includes a metal oxide semi-conductor (MOS) unit, and when the system changes from the active mode to the idle mode, the MCU outputs an idle signal to the PMU and then powers itself off, the PMU outputs the interrupt signal to inform the control module to store the configuration information in response to the idle signal, and the PMU issues a gate control signal to a gate of the MOS to shut down the peripheral circuit after the configuration information has been stored in the control module.

5. The system as in claim 1, further comprising a micro control unit (MCU), wherein the first mode is an idle mode and the second mode is an active mode, the peripheral circuit includes a metal oxide semi-conductor (MOS) unit and has a built-in timer setting, and when the system changes from the idle mode to the active mode, the PMU issues a gate control signal to a gate of the MOS to power on the peripheral circuit in response to the built-in timer setting, the PMU outputs the interrupt signal to inform the control module to restore the configuration information, and the PMU outputs an activate signal to wake up the MCU.

6. The system as in claim 1, further comprising a micro control unit (MCU), wherein the control module includes an instruction memory (IM), the MCU configures a pointer address when the system is initialized, wherein the pointer address defines where the configuration information should be stored in the IM, and the pointer address includes a plurality of control bits that specify one of a single read operation and a consecutive read operation that should be performed by the control module per a storage instruction.

7. The system as in claim 6, wherein the plurality of control bits include a least significant bit and a predetermined number of bits which are consecutive following the least significant bit, the least significant bit determines one of the single read operation and the consecutive read operation should be performed, and the predetermined number of bits determine how many consecutive read operations should be performed per the storage instruction.

8. A system having a first power mode and a second power mode, comprising:
    a peripheral circuit having a configuration information representative of a circuit state thereof;
    a control module;
    a power management unit (PMU) configured to enable the control module to store the configuration information when the system is in the first power mode and to retrieve the configuration information when the system is in the second power mode; and
    a micro control unit (MCU), wherein:
    the first power mode is an idle mode, and the second power mode is an active mode;
    the peripheral circuit includes at least a flip-flop register to contain the configuration information when the peripheral circuit is powered on;
    the control module includes an instruction memory (IM);
    the MCU programs the instruction memory to set up a backup procedure when the system is initialized;
    the control module configures the peripheral unit to write a pointer address to where a first address of the IM is referred, wherein the pointer address indicates where the configuration information is stored; and
    the control module reads the configuration information located at the pointer address and stores the configuration information at a second address of the instruction memory when the backup procedure starts and the control module executes a storage instruction, wherein the second address is the first address accumulated by a single offset value.

9. The system as in claim 8, wherein the pointer address includes a plurality of control bits having a least significant bit and predetermined number of bits which are consecutive following the least significant bit, the least significant bit determines whether one of a single read operation or a consecutive read operation should be performed, and the predetermined number of bits determine how many consecutive read operations should be performed per the storage instruction.

10. The system as in claim 8, wherein:
the PMU informs the control module to start a restoration procedure when the system is switched from the idle mode to the active mode;
the pointer address includes a plurality of control bits including a least significant bit and a predetermined number of bits which are consecutive following the least significant bit, the least significant bit determines whether one of a single write operation or a consecutive write operation should be performed, and the predetermined number of bits determine how many consecutive write operations should be performed per a restoring instruction; and
the control module performs a write operation to restore the configuration information to the peripheral unit when the restoration procedure starts and the control module executes a restoration instruction, wherein the write operation includes:
the control module retrieves the configuration information at a second address of the instruction memory;
the control module writes the configuration information to the peripheral unit to complete restoration of the configuration information; and
the control module continues the write operation when the least significant bit indicates that a consecutive write operation should be performed.

11. The system as in claim 10, wherein the pointer address includes 32 binary bits, the consecutive write operation writes at least two sequences of 32 binary bits for the configuration information, and writes an additional sequence of 32 binary bits when at least one rest bit of the configuration information remains, wherein the at least one rest bit is less than 32 bits.

12. The system as in claim 10, wherein:
if the pointer address is not null, the first address of the IM is increased by a single offset which is 4 bytes; and
if the pointer address is null, the system waits for another restoration instruction.

13. A system having a first mode, a second mode and a system bus, comprising:
a peripheral circuit having a configuration information representative of a circuit state thereof;
a control module having a storage device, storing the circuit state into the storage device via the system bus when the system is switched from the first mode to the second mode, and retrieving the circuit state from the storage device via the system bus when the system is switched from the second mode to the first mode; and
a micro control unit (MCU), wherein the control module includes an instruction memory (IM), the control module configures a pointer address when the system is awakened, wherein the pointer address defines where the configuration information should be restored to the peripheral unit, and the pointer address includes a plurality of control bits that specify whether one of a single write operation or a consecutive write operation should be performed by the control module per a restoration instruction.

14. The system as in claim 13, wherein the control module is a programmable controller including:
a master interface configured to access the configuration information through the system bus by issuing one of a storage and a restoration commands; and
a slave interface configured to be controlled by a master device through the system bus, wherein the master device is the micro control unit (MCU), and the slave interface includes:
a control register configured to store a task arrangement, a trigger event mask setting and a status of the controller, wherein the control register is configured by the master device via the slave interface; and
the instruction memory (IM) configured to store a program.

15. The system as in claim 14, wherein:
the first mode is an active mode, and the second mode is an idle mode;
the control module is used with a power management unit (PMU) and further includes:
a state machine unit configured to operate under the program; and
an event detector configured to trigger the state machine unit by at least one event selected from a group consisting of a general purpose input and output, a timer expiration and an enable signal through an additional connection.

16. The system as in claim 15, wherein:
when the system is initialized, the MCU configures the slave interface to program the IM;
when the system is switched from the active mode to the idle mode, the MCU informs the PMU by outputting an idle signal and goes idle, the PMU outputs an enable signal in response to the idle signal, the event detector triggers the state machine to store the configuration information under the program in response to receiving the enable signal, and then the PMU shuts down the peripheral unit; and
when the system is switched from the idle mode to the active mode, the PMU powers on the peripheral unit in response to the built-in time out thereof, restores the configuration information, and then powers on the MCU by outputting an activating signal.

17. The system as in claim 13, wherein the plurality of control bits include a least significant bit and a predetermined number of bits which are consecutive following the least significant bit, the least significant bit determines whether one of the single write operation or the consecutive write operation should be performed, and the predetermined number of bits determine how many consecutive write operations should be performed per the restoration instruction.

* * * * *

UNITED STATES PATENT AND TRADEMARK OFFICE
CERTIFICATE OF CORRECTION

PATENT NO. : 10,289,492 B2
APPLICATION NO. : 15/133710
DATED : May 14, 2019
INVENTOR(S) : Fabien Petitgrand and Huang-Lun Lin It is certified that error appears in the above-identified patent and that said Letters Patent is hereby corrected as shown below:

On the Title Page

Item (73) Assignee: change "M2 Communication Inc." to --M2Communication Inc.--.

Signed and Sealed this
Twenty-eighth Day of January, 2025

Coke Morgan Stewart
*Acting Director of the United States Patent and Trademark Office*